(12) United States Patent
Galik

(10) Patent No.: US 8,657,509 B2
(45) Date of Patent: Feb. 25, 2014

(54) CAMERA MOUNTING DEVICE

(76) Inventor: Christopher Galik, Palos Hills, IL (US)

( * ) Notice: Subject to any disclaimer, the term of this patent is extended or adjusted under 35 U.S.C. 154(b) by 0 days.

(21) Appl. No.: 13/592,101

(22) Filed: Aug. 22, 2012

(65) Prior Publication Data
US 2013/0058639 A1 Mar. 7, 2013

Related U.S. Application Data

(60) Provisional application No. 61/575,492, filed on Aug. 22, 2011.

(51) Int. Cl.
G03B 17/00 (2006.01)
F41G 1/38 (2006.01)

(52) U.S. Cl.
USPC .............................. 396/428; 396/426; 42/124

(58) Field of Classification Search
USPC .......... 396/428, 419, 421, 424, 426; 348/373; 352/197, 243; 42/124
See application file for complete search history.

(56) References Cited

U.S. PATENT DOCUMENTS

| 6,425,697 | B1 | 7/2002 | Potts et al. | |
|---|---|---|---|---|
| 7,604,420 | B2 | 10/2009 | Moody et al. | |
| 7,661,221 | B2 | 2/2010 | Holmberg | |
| 2010/0126487 | A1* | 5/2010 | Holmberg | 124/88 |
| 2010/0313462 | A1* | 12/2010 | Holmberg | 42/124 |

* cited by examiner

Primary Examiner — Rochelle-Ann J Blackman
(74) Attorney, Agent, or Firm — Ruth Eure

(57) ABSTRACT

The present camera mounting device is designed as an paintball marker or gun accessory. It can be used with either still or video cameras. It is comprised a bracket and an adjustable clamp. The bracket is comprised of a horizontal member and a vertical member that are connected at ninety degree angles to each other. The clamp is attached to the vertical member of the bracket with a screw. To use the mounting device, a camera is either top mounted or bottom mounted to the horizontal member via a thumbscrew. The adjustable clamp fits onto the barrel of a paintball marker, gun or rifle. The diameter of the clamp is adjusted by releasing a lock on the locking clamp screw on the clamp and turning the screw either clockwise or counter clockwise.

3 Claims, 2 Drawing Sheets

CAMERA MOUNTING DEVICE

CROSS-REFERENCE TO RELATED APPLICATIONS

The present application claims priority under 35 USC 119 (e) (1) from U.S. Provisional Patent Application Ser. No. 61/575,492, filed Aug. 22, 2011, for Galik Attach-A-Cam of common inventorship.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention pertains to the field of paintball and gun accessories, and more specifically to the field of camera mounts for paintball markers and other guns and rifles.

BACKGROUND OF THE INVENTION

The sport of paintball has grown into an international phenomenon. Paintball combines aspects of the childhood games such as tag and hide and seek, but is far more challenging and sophisticated. Typically, a group of players divides into two teams to play capture the flag. The object is to capture the other team's flag while protecting your own. While trying to capture the opponent's flag, players also eliminate opposing players by tagging them with a paintball bullet expelled from a special air gun called a marker. In just thirty years of existence, paintball has become one of the world's most exciting outdoor participation sports played men and women of all ages and lifestyles. One popular on line auction website reports more searches for paintball items than for any other sports listing. Spending for equipment and paraphernalia tops approximately two hundred twenty five million dollars per year. Paintball, a harmless but realistic facsimile of combat, is a highly competitive sport. A serious player may preserve and study a visual, photographic or video record of his or her performance on the field for training purposes. The prior art has put forth several designs for camera capability for paintball guns and hunting shotguns and rifles.

U.S. Pat. No. 7,661,221 to Larry Holmberg describes a device mount for attaching electronic devices to a weapon. This device comprises a support portion and a side portion. The support portion, adapted to support a device, includes a plurality of mounting apertures and is coupled to the support portion. The side portion, positioned at a right angle to the support portion, has two sides. The first side is positioned at a right angle and connects to the support portion. The second side has a mounting connection portion for connecting the device mount to a weapon.

U.S. Pat. No. 7,604,420 to Jeffrey R. Moody, Kevin L. Moody, and James R. Dodson describes a gun and bow camera mount providing an apparatus capable of mounting a conventional hand held camera to any of various hunting weapons. The gun and bow camera mount include a camera support having a camera mount resiliently biased against a carriage. The camera mount portion secures to a conventional hunting weapon such that the shooting vector is fixed in a direction parallel to the line of fire of the weapon.

U.S. Pat. No. 6,425,697 to Jeff C. Potts and Richard M. Allen describes a universal camera mounting assembly comprising an assembly for a weapon including a mount for direct attachment to the weapon wherein a parallelogram linkage includes a pair of depending swing arms, each of which is pivotally secured at one end in the mount and at the opposite end a camera support.

None of these prior art references describe the present invention.

SUMMARY OF THE INVENTION

The present invention is a mounting device for mounting a still or video camera, scope, or light to a paintball marker or other gun. More specifically the mounting device consists of a bracket with a horizontal member, to which the camera is attached, and a vertical member, to which a clamp is attached. The camera may be top mounted, such that the bracket is positioned such that the camera sits on top of the horizontal bracket member, or bottom mounted such that the top of the camera is attached to the bottom of the horizontal bracket member. A clamp is attached to the vertical member of the bracket. The clamp is adjustable of is designed to receive the barrel of a paintball marker or other gun.

DETAILED DESCRIPTION OF THE INVENTION

Figure 1:
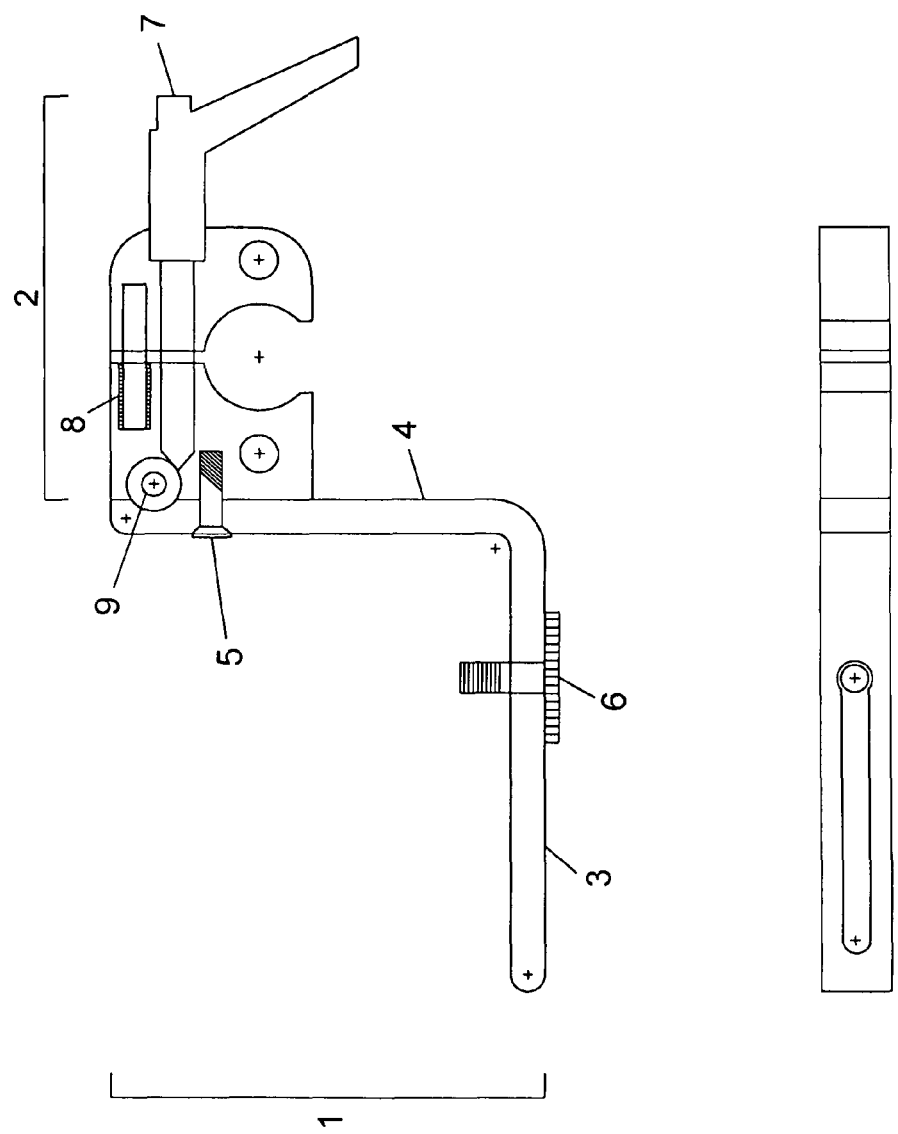
FIG. 1 is a side view of the present invention configured in the top mount position.
Figure 2:
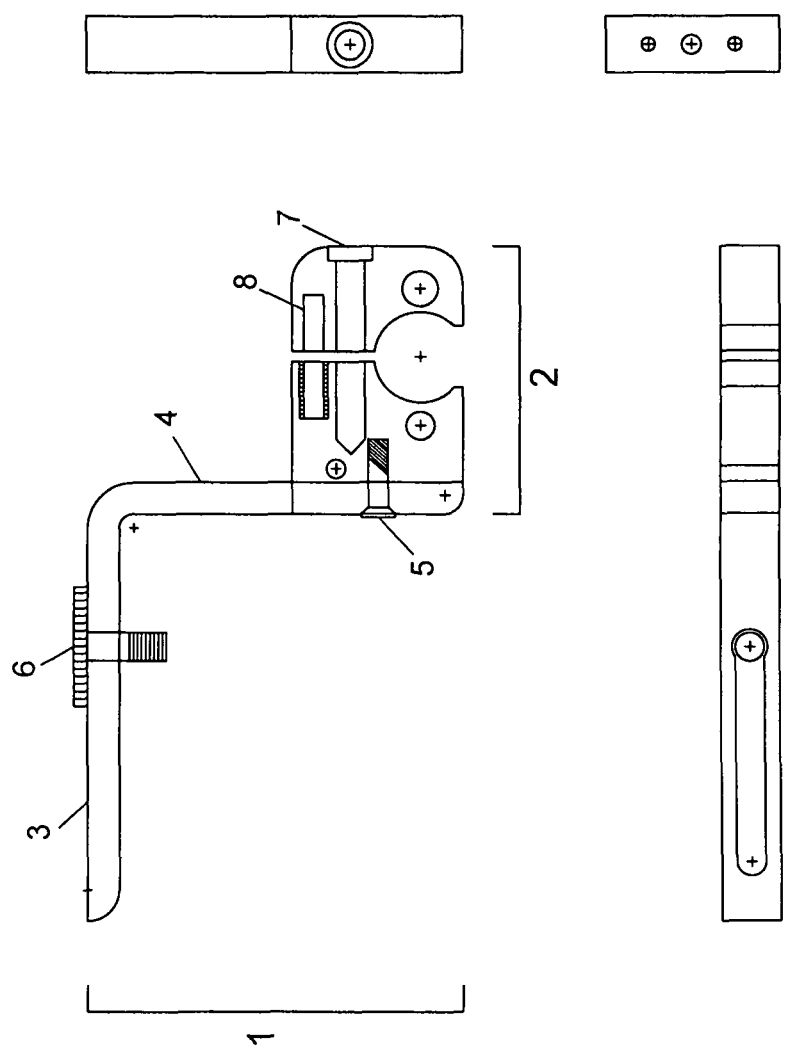
FIG. 2 is a side view of the present invention configured in the bottom mount position.

As shown in FIG. 1 the present camera mounting device is comprised a bracket [1] and an adjustable clamp [2]. The bracket is comprised of a horizontal member [3] and a vertical member [4] that are connected at ninety degree angles to each other. The clamp [2] is attached to the vertical member of the bracket with a screw [5]. To use the mounting device a camera is either top mounted, as shown in FIG. 1, or bottom mounted, as shown in FIG. 2, to the horizontal member via a thumbscrew [6]. The adjustable clamp fits onto the barrel of a paintball marker, gun or rifle. The diameter of the clamp is adjusted by releasing the lever on the locking clamp screw [7] and turning the lever either clockwise to fit smaller barrels or counter clockwise to fit larger barrels. A guide pin is included in the clamp [8].

FIG. 2 shows the present camera mounting device in the top mount configuration. The bracket [1] is flipped over with respect to its configuration in FIG. 1 such that the vertical member [4] hangs down. The clamp [2] is again fitted to the vertical member with a screw [5]. There is en adjustable screw [9] between screw [5] and clamp [8] which can adjust the alignment of the camera with the target. The thumbscrew [6] on the horizontal member serves to secure a camera to the bracket. The locking clamp screw [7] serves to adjust the clamp to fit to the barrel of a paintball marker or gun.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A mounting device comprising a bracket and an adjustable clamp, wherein:
   said bracket is comprised of a horizontal member and a vertical member that are connected at ninety degree angles to each other;
   and the adjustable clamp is attached to the vertical member of the bracket with a screw;
   and a thumbscrew is contained on the horizontal member for attaching a camera;
   and the adjustable clamp is adjusted to fit a barrel of a shooting device with a locking screw and wherein the diameter of the clamp is adjusted by releasing a lever on a locking clamp screw and turning the lever either clockwise to fit smaller barrels or counter clockwise to fit larger barrels; and further wherein a guide pin is included in the clamp.

2. The mounting device comprising a bracket and an adjustable clamp of claim 1, wherein:
   the thumbscrew contained on the horizontal member for attaching a camera is configured to mount the camera on the top of the horizontal member.

3. The mounting device comprising a bracket and an adjustable clamp of claim 1, wherein:
   the thumbscrew contained on the horizontal member for attaching a camera is configured to mount the camera on the bottom of the horizontal member.

* * * * *